United States Patent
Wan et al.

[11] Patent Number: 5,860,747
[45] Date of Patent: Jan. 19, 1999

[54] GREASE LUBRICATED ROLLING ELEMENT BEARING COMPRISING A CAGE COATED WITH A SOLID LUBRICANT CONTAINING COATING

[75] Inventors: George Tin Yau Wan, Houten; Bo Olov Jacobson, Zeist, both of Netherlands

[73] Assignee: SKF Industrial Trading and Development Company B.V., Nieuwegein, Netherlands

[21] Appl. No.: 954,857

[22] Filed: Oct. 21, 1997

Related U.S. Application Data

[63] Continuation of Ser. No. 508,268, Jul. 27, 1995, abandoned.

[30] Foreign Application Priority Data

Jul. 27, 1994 [NL] Netherlands ............................ 9401234

[51] Int. Cl.$^6$ ............................ F16C 19/00; F16C 33/44; F16C 33/48
[52] U.S. Cl. ........................... 384/463; 384/470; 384/527; 384/572; 384/902
[58] Field of Search ..................................... 384/463, 470, 384/523, 527, 572, 902; 508/108, 166, 167

[56] References Cited

U.S. PATENT DOCUMENTS

| | | |
|---|---|---|
| 3,198,735 | 8/1965 | Lamson et al. ........................ 384/463 |
| 3,500,525 | 3/1970 | Glenn . |
| 3,843,962 | 10/1974 | Bogue ..................................... 384/463 |
| 5,222,816 | 6/1993 | Kondoh et al. ......................... 384/463 |
| 5,262,216 | 11/1993 | Popat et al. . |

FOREIGN PATENT DOCUMENTS

| | | |
|---|---|---|
| 0296291 | 12/1988 | European Pat. Off. ............... 384/463 |
| 0349410 | 1/1990 | European Pat. Off. . |
| 3041558 | 6/1982 | Germany ............................... 384/463 |
| 3611907 | 10/1986 | Germany ............................... 384/463 |
| 4139426 | 6/1992 | Germany ............................... 384/463 |
| 0100422 | 7/1980 | Japan ..................................... 384/463 |
| 1515643 | 6/1978 | United Kingdom . |
| 2034417 | 6/1980 | United Kingdom ................... 384/463 |
| 2250549 | 6/1992 | United Kingdom . |

OTHER PUBLICATIONS

English language abstract of JP–A–62–141314.
English language abstract of JP–A–1–012130.
English language abstract of JP–A–3–255223.
English language abstract of JP–A–61–09022.
5,288,222, Nov. 1993, Japan, Cl–384, Subclass 463.
6,159,373, Jun. 1994, Japan, 384/463.
2,190,616, Jul. 1990, Japan, 384/463.
5,001,718, Jan. 1993, Japan, 384/463.
0,049,418, May 1981, Japan, 384/463.
0,270,826, Nov. 1987, Japan, 384/463.
0,176,821, Jul. 1988, Japan, 384/463.
0,125,824, May 1988, Japan, 384/463.

Primary Examiner—Charles A. Marmor
Assistant Examiner—Matthew A. Kaness
Attorney, Agent, or Firm—Oliff & Berridge, PLC

[57] ABSTRACT

A greased lubricated rolling element bearing including an inner ring, an outer ring, a plurality of rolling elements disposed between said rings, and a cage for holding the rolling elements at a predetermined mutual spacing, has a lubricating grease composition present on the surfaces of said rings, said rolling elements and said cage. The cage is coated on at least the parts of its surface that are in sliding contact with said rolling elements, said inner ring or said outer ring, with a solid lubricant containing coating for lowering the running temperature of at least the cage. The solid lubricant containing coating preferably comprises a disulfide and/or diselenide of a Group V or VI transition metal, more preferably $MoS_2$ and/or $WS_2$ in combination with an organic resin such as PTFE.

12 Claims, 7 Drawing Sheets

GREASE LUBRICATED ROLLING ELEMENT BEARING COMPRISING A CAGE COATED WITH A SOLID LUBRICANT CONTAINING COATING

This is a Continuation of application Ser. No. 08/508,268 filed Jun. 27, 1995 now abandoned.

BACKGROUND OF THE INVENTION

The present invention relates to a greased rolling element bearing, in which elements of the bearing such as the bearing cage or roller ends have been coated with a solid lubricant coating.

Rolling element bearings usually comprise an outer and an inner ring, rolling elements in the bearing space between said rings, and a cage for holding the rolling elements at a predetermined mutual spacing as well as a grease for providing lubrication.

Despite the presence of said grease, during service of such a bearing, the cage and the rolling elements are in sliding contact. This results in friction and wear, which limit the service life of such a sliding contact.

In order to reduce the friction and wear it is known to apply a manganese phosphate-coating in the cage pockets which contain the rolling elements. However, such a manganese phosphate coating is not satisfactory for several reasons. One reason is that these coatings are only useful for "running in" the bearing, e.g. only provide an initial reduction of the friction at the beginning of the service life. After a certain period, the phosphate coating will disappear causing metal to metal contact, a higher running temperature and/or the deterioration of the grease which is located in the bearing. In some cases this can locally lead to "burnt" grease end/or dry running of the bearing. Therefore, some grease lubricated roller bearings with standard manganese phosphate coated steel cages give diminutive tribological protection in the contacts between roller and cage pocket. This will generally lead to the formation of brown bands on rollers and raceways. This is attributed to high sliding contact stress and poor lubrication conditions between roller and cage contacts.

Other factors which adversely influence the condition of the grease in the bearing, the running temperature, and the useful service life of the bearing are the high thermal stressing which occurs between the bearing cage and the rolling elements, and the lack of supply of grease between the components of the bearing.

As a result of these problems, bearings which comprise phosphate-coated cages should be relubricated frequently; if such frequent lubrication is omitted, the useful service life of the bearing is impaired.

SUMMARY OF THE INVENTION

The object of the invention is therefore to provide a rolling element bearing which does not suffer from the above disadvantages. This object is achieved in that the bearing cage is coated with a coating for lowering the running temperature of the cage, and thus of the bearing.

The invention therefore relates to a bearing cage for a rolling element bearing, characterized in that the cage is coated with a solid lubricant containing coating for lowering the running temperature of the cage. Such coatings will generally contain a disulphide or diselenide of a Group V or VII transition metal. According to an especially preferred embodiment, the coating contains $MoS_2$ and/or $WS_2$, optionally in combination with polytetrafluoroethylene (PTFE).

DETAILED DESCRIPTION OF PREFERRED EMBODIMENTS

Figure 1:
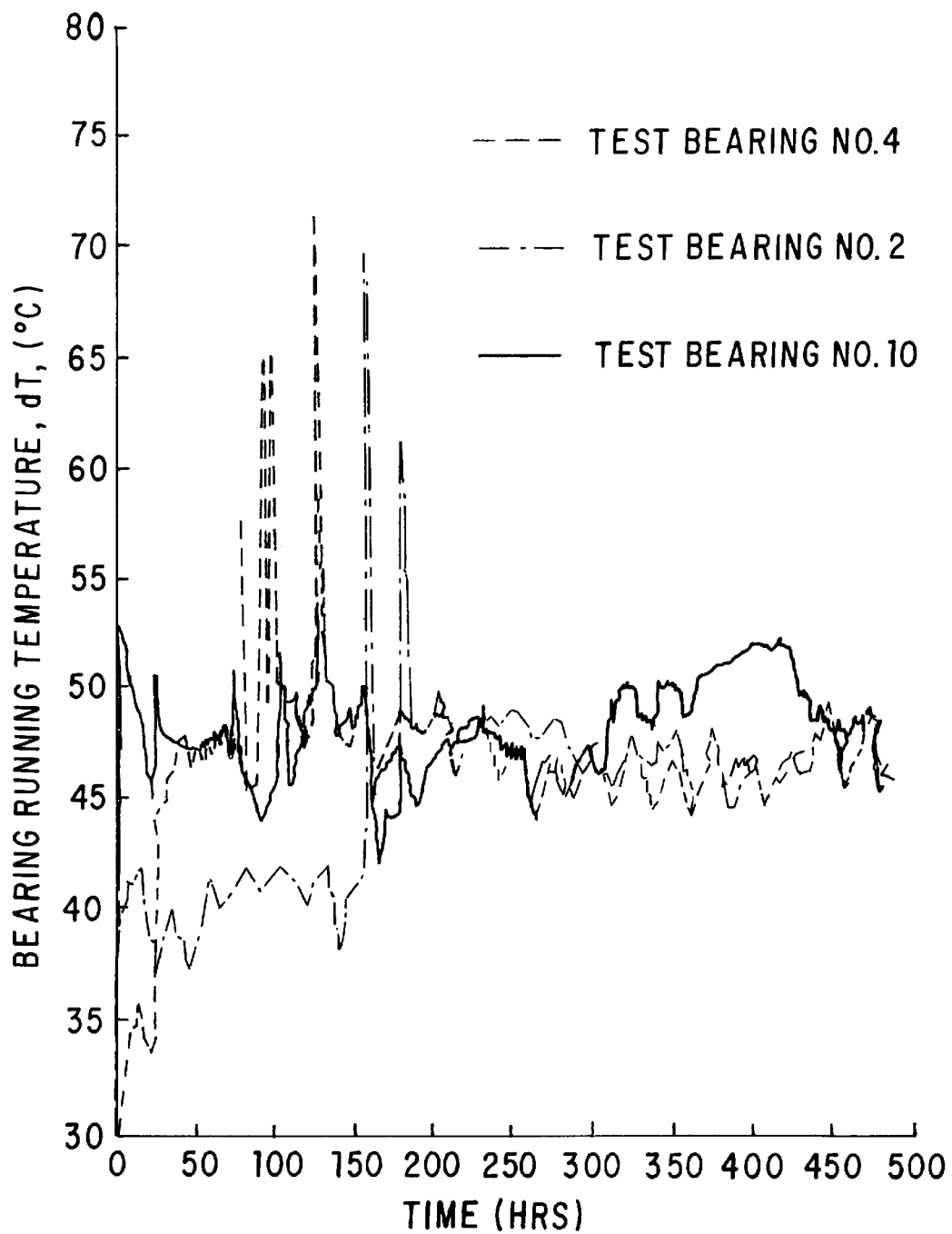
FIG. 1 is a running temperature graph showing bearing performance of standard phosphate cages.

A number of rolling element bearings with $MOS_2$-coatings present on the cage and/or as a solid lubricant are known in the art, vide for instance U.S. Pat. No. 3,500,525, JP-A-62 141 314 and JP-A-3 255 223. However, all these references relate to bearings for use in (high) vacuum and/or at elevated temperatures (250° C. or more), which for obvious reasons cannot be subjected to grease lubrication. Such non-grease lubricated bearings for use in a high vacuum/temperature environment are not claimed by the present application.

British patent specification 1 515 643 describes bearings of the ball and roller type, in which the balls and rollers are retained in position by a cage, said cage having a covering of a low friction plastics material such as PTFE in order to reduce contact friction.

However, this reference is silent with respect to solid lubricants containing coatings, such as $MoS_2$ and/or $WS_2$ containing coatings. As will be seen from the examples hereinbelow, the presence of such a coating, such as a $MoS_2$/PTFE containing coating, on the bearing cage has a favourable influence on the properties of the grease in the bearing, also when compared to a coating containing PTFE alone.

Although not limited thereto, it is believed that the presence of solid lubricants in the polymeric coating provide for improved affinity with the grease/oil and an increase in load carrying properties under poor lubrication conditions, thereby increasing the grease life.

Furthermore, it is well known in the art that the wear rate of PTFE is very poor, so that a bearing with PTFE alone will have a relatively short lifetime compared to the solid lubricant coatings of the present application.

The term "solid lubricant" is well known in the art and can generally be defined as a solid material with low friction and low wear rate. The term "solid lubricant coating" is therefore herein defined as a coating with good adhesion containing said solid lubricants.

Said solid lubricant will usually comprise a bisulfide or diselenide of a transitional metal of group V or VI of the periodic table of the elements, and/or a combination thereof. Especially preferred solid lubricants are $MoS_2$ and $WS_2$. Such coatings are well known in the art and are for instance described in the above-mentioned references.

The solid lubricant of the invention is preferably present in admixture with an organic resin, such as PTFE, polyamide, or other polymeric materials such as polycarboxindole, or polypyrrole. These resins function as a binder so as to carry the solid lubricant giving a much better bearing performance.

As such, any solid lubricant containing coating which gives a lower running temperature can be used. Commercially available examples are the $MoS_2$/PTFE containing coating produced by the Eeonyx-company. USA, the PTFE/$MoS_2$ coating produced by Dowty. Great Britain (product 1052) and the $MoS_2$ containing Molykote coating 7409 (Dow Corning).

An example of a commercially available $WS_2$ coating is Dichronite.

Such coatings are well known in the art and were used in the prior art for corrosion protection, and permanent lubrication of bolts, hixes etc. as well as the lubrication of engine and gear parts, e.g. pistons.

The present invention is based on the surprising finding that during service, bearings which are coated with solid lubricant coatings still have an effective exunt of grease in place on their surfaces, even through these coated surfaces show less friction than the metallic surfaces usually present in non-coated bearings. Due to the lower friction of the coating it was to be expected that the solid lubricent coatings would be less effective in holding the lubricant into place on the cage.

During service of the bearing, all elements of the bearing which are in sliding contact should have lubricant present on their contact surfaces. Especially in for instance rolling element bearings, there is a constant pressure forcing out the grease due to the centrifugal forces which act on the grease as the bearing rotates at high speed. It was therefore to be expected that with cages, coated with a solid lubricant coating, that the grease would be forced out of the critical contact services and/or even thrown off the cage entirely, therefore reducing the amount of lubricant available for lubrication.

However, according to the present invention it has now been found that the negative effect of the solid lubricant coating according to the invention on holding the lubricant in place is more than offset by the lower running temperature which is obtained when such a solid lubricant coating is used on the cages. Because of this, the solid lubricant coating has an overall positive effect on the grease life, the service life of the bearing as well as the lubrication intervals required.

In this respect coatings containing said solid lubricants in a plastics material such as PTFF give better results than coatings containing PTFE alone, such as described in GB patent specification 1,515,643. Due to their higher surface tension, the $MoS_2$ coatings give better "wetting" of the surfaces of the cage with the oil and/or grease, improved grease/oil affinity and adhesion and an increase in load carrying properties, thereby further improving grease life.

The better adhesion of the solid lubricant containing coatings to the coated surfaces is also an important factor in holding the grease in place.

Besides giving a lower running temperature and better adhesion of the lubricant these coatings also provide better adhesion to the substrate (e.g. the bearing cage) than the phosphate coatings and/or PTFE coatings of the state of the art, so that they are effective during a longer period of time.

Another advantage of the PTFE/$MoS_2$ coatings is that they are less hazardous to the environment than, for instance, lead containing coatings.

The invention is, however, not limited to $MoS_2$/PTFE containing coatings, and any solid lubricant coating which gives a low running temperature of the cage and/or bearing can be used. Such solid lubricant coatings can be easily determined by a man skilled in he art by means of the methods described in the Example, i.e. determining the running temperature of the bearing in a manner known per se. Preferably, the solid lubricant coatings also show good adhesion to the substrate.

According to the present invention the entire cage can be coated with the solid lubricant coating, or just the parts and surfaces of the cage which are in sliding contact with the rolling elements or guide rings, such as the cage pockets and/or cage bars, as will be clear to a man skilled in the art. Costing the cage bars with a solid lubricant coating can also be used to create smaller more accurate cage pockets with lower friction.

The coating according to the invention will give an improvement in cage performance in ball and roller bearings; which improves the bearing fatigue life, as can be seen in bearing life tests. The coating according to the invention can be used in the bore of, for instance, vibrating screen bearings (SAB).

Applying a solid lubricant polymer coating, preferably containing PTFE sintered with defined thickness 10–15 $\mu$m giving a cage pocket with defined pocket play and a defined cage bar shape, which allows the cage for excentric running, gives an ideal combination for improving the rolling element guidance. In doing so, negative aspects, such as an increased cage friction by a wear process, scraping off of the lubricant and metal to metal contact, high noise from the cage, and a low life are avoided by using a solid lubricant coating according to the invention in this kind of application.

According to a preferred embodiment, both the cage pockets and the cage bars are coated with a solid lubricant coating for lowering the running temperature.

By coating the cage of a rolling element bearing with such a coating, the following advantages are obtained:

a lower running temperature of the cage and the bearing as compared to the manganese phosphate coatings of the state of the art;

the grease around the contacts remains in good condition for a longer period of time resulting in an improvement of the overall lubrication;

local burning of grease does not occur;

a longer useful service life of the rolling element bearing.

a better retention of the grease lubricant in the cage, in particular on the cage bars which are situated between the rolling elements and which slide along these elements.

longer relubrication intervals;

lower thermal stressing with respect to the rolling elements;

better retention of the lubricant on the rolling elements themselves, leading to a less, even no brown band formation on these elements and the rings:

the presence of a thicker lubricant layer on the rolling elements, which lubricant layer will not easily be scraped off by the cage bars, thereby also providing a better lubrication between the rolling elements and the bearing rings;

the coated surfaces of the invention can be provided with grooves for transporting the lubricant to the contact surfaces, giving even better lubrication of the critical surfaces during service.

In service, during overlong the lubricant film is slowly moved out of the contact track. In non-vibrating starved lubricated line contact bearings and other types of lubricated bearings, the grooves in the coated surfaces could provide an additional active mechanism to replenish/redistribute the lubricant film, thereby preventing lubricant film break-down and subsequent bearing failure. By applying a pattern of grooves on the cage wall the sliding motion between roller and cage bar will induce a lubricant motion towards the centre and thus concentrate the lubricant in the center of the track, counteracting the lubricant film break-down and its consequences described above. By applying the same patterns of grooves on both the cage bars, the lubricant film transport towards the center of the rolling track occurs irrespective of the bearing rotation direction. Therefore, these grooves will give a decrease in contact stress and an increase in both grease and bearing life. The form and number of the grooves will be dependent on, for instance, the cage and bearing used and the application of suitable grooves will be apparent to a man skilled in the art.

The solid lubricant coatings can be applied to the cage by any suitable method, such as dipping, spraying etc., which methods will be obvious to a man skilled in the art, and/or are described in for instance the abovementioned prior art. Preferably however the PM/$MoS_2$ coating is applied by means of "shot peening", which is described in U.S. patent application Ser. No. 5,262,214. Cages coated by this method give even better results than the cages coated by spraying or dipping.

Preferably, the coating has a thickness of 5–10 $\mu$m. It is, however, possible to apply a thicker coating in order to obtain a cage pocket that gives better guidance to the rolling element while maintaining a solid lubricant.

According to a further aspect of the present invention the use of solid lubricant coatings can also greatly improve the tribological performance of roller-flange contact of taper roller bearing lubrication. This application overcomes the poor lubrication and wear problems of roller-flange contacts in service, in particular under high applied axial loading condition. The bearing life improvement can be simply done by applying the said coatings on the roller ends. The contact temperature will be reduced, and minimal metallic wear is resulted, and thus, longer lubricant life is expected.

The invention therefore further relates to the use of the above solid lubricant coatings on roller ends, for lowering the running temperature of the rollers and/of bearing, improving the life of the grease present in the bearing and/or improving the service life of roller element bearings, especially taper roller bearings, as well as to roller ends coated with a solid lubricant coating according to the invention.

Figure 6:
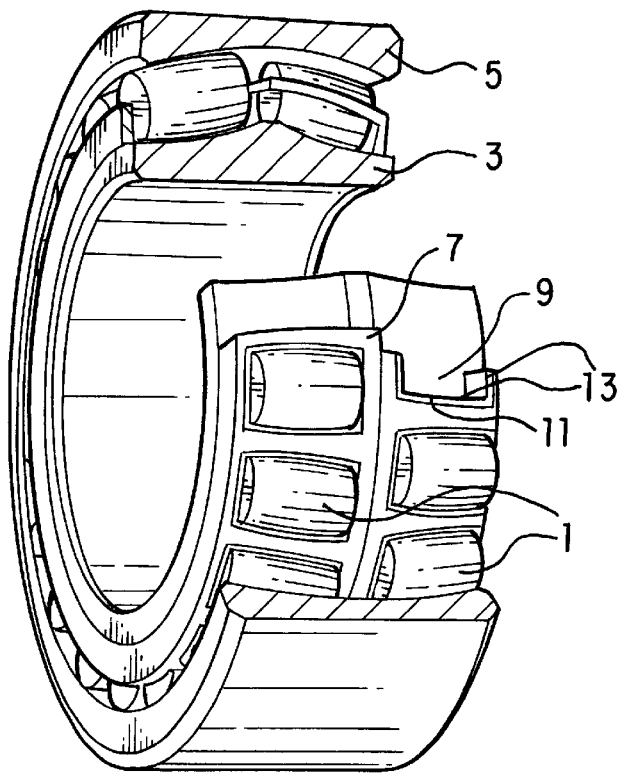
FIG. 6 is a representative roller bearing.

FIG. 6 is representative of a spherical roller bearing. In the figure, reference numeral 1 denotes the rolling elements, 3 the inner ring, 5 the outer ring, 7 the cage, 9 the raceway (shown only for the inner ring in FIG. 6) and 11 and 13 represent some of the parts of the cage (pockets) in sliding contact with the roller elements. For example, the portion 11 is the cage bar.

Figure 7:
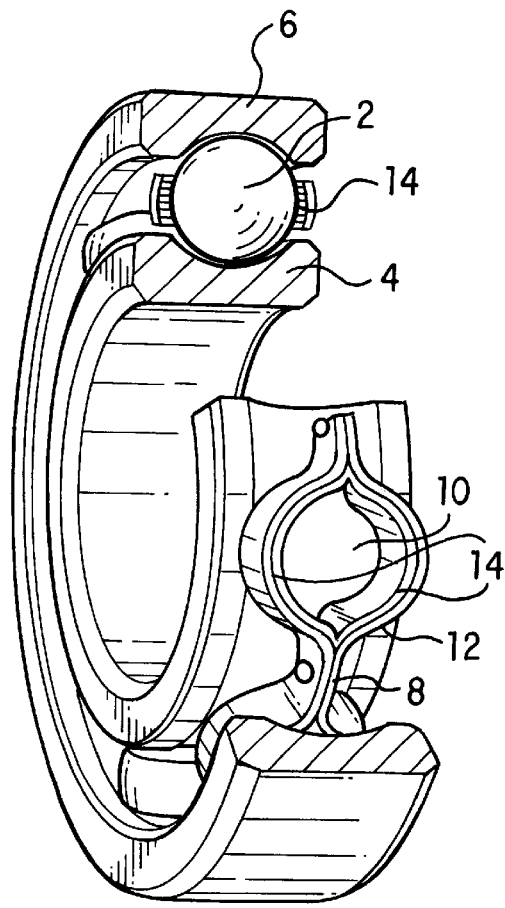
FIG. 7 is a representative ball bearing.

FIG. 7 shows a representative ball bearing. In the figure, reference numeral 2 denotes the ball, 4 the inner ring, 6 the outer ring, 8 the cage, 10 the cage pocket (shown in the figure for the inner ring only) and 12 and 14 represent some of the parts of the cage (pockets) in sliding contact with the roller elements. However, other designs for spherical roller bearings and ball bearings are known in the art, and the present invention is not limited to the designs depicted in FIG. 6 and FIG. 7.

The invention will now be illustrated by means of the following example in which the performance of the solid lubricant coating for lowering the running temperature is compared to a manganese phosphate coating according to the state of the art, as well as a PRCA-coating, which does not give a lower rung temperature and a coating containing PTFE alone. The FIGS. 1–5 are running temperature graphs vs time for the bearings used in the Examples, showing:

FIG. 1. Bearing performance of standard phosphate cages

Figure 2:
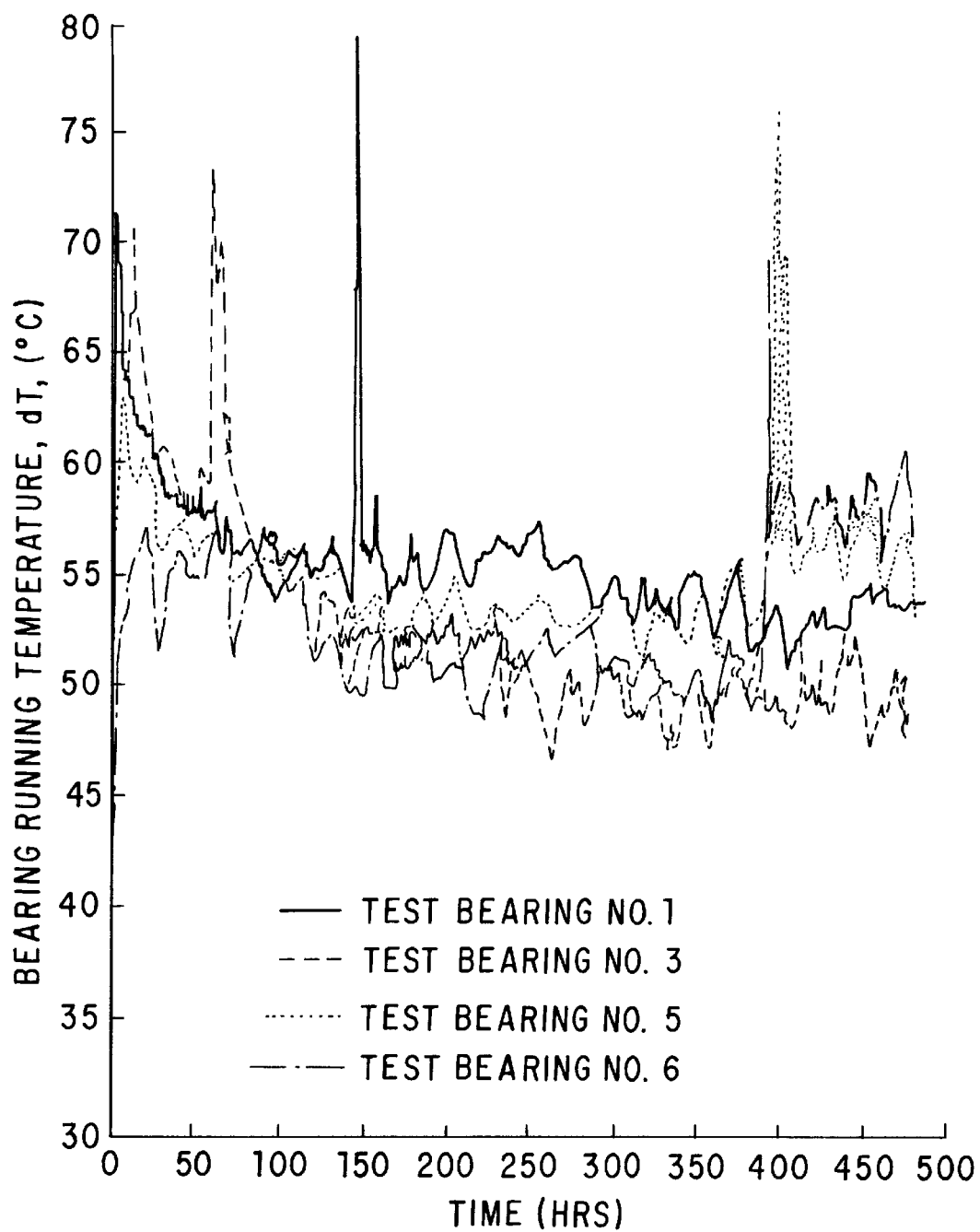
FIG. 2 is a running temperature graph showing bearing performance of PCRA-coated cages.

FIG. 2: Bearing performance of PCRA-coated cages (comparative)

Figure 3:
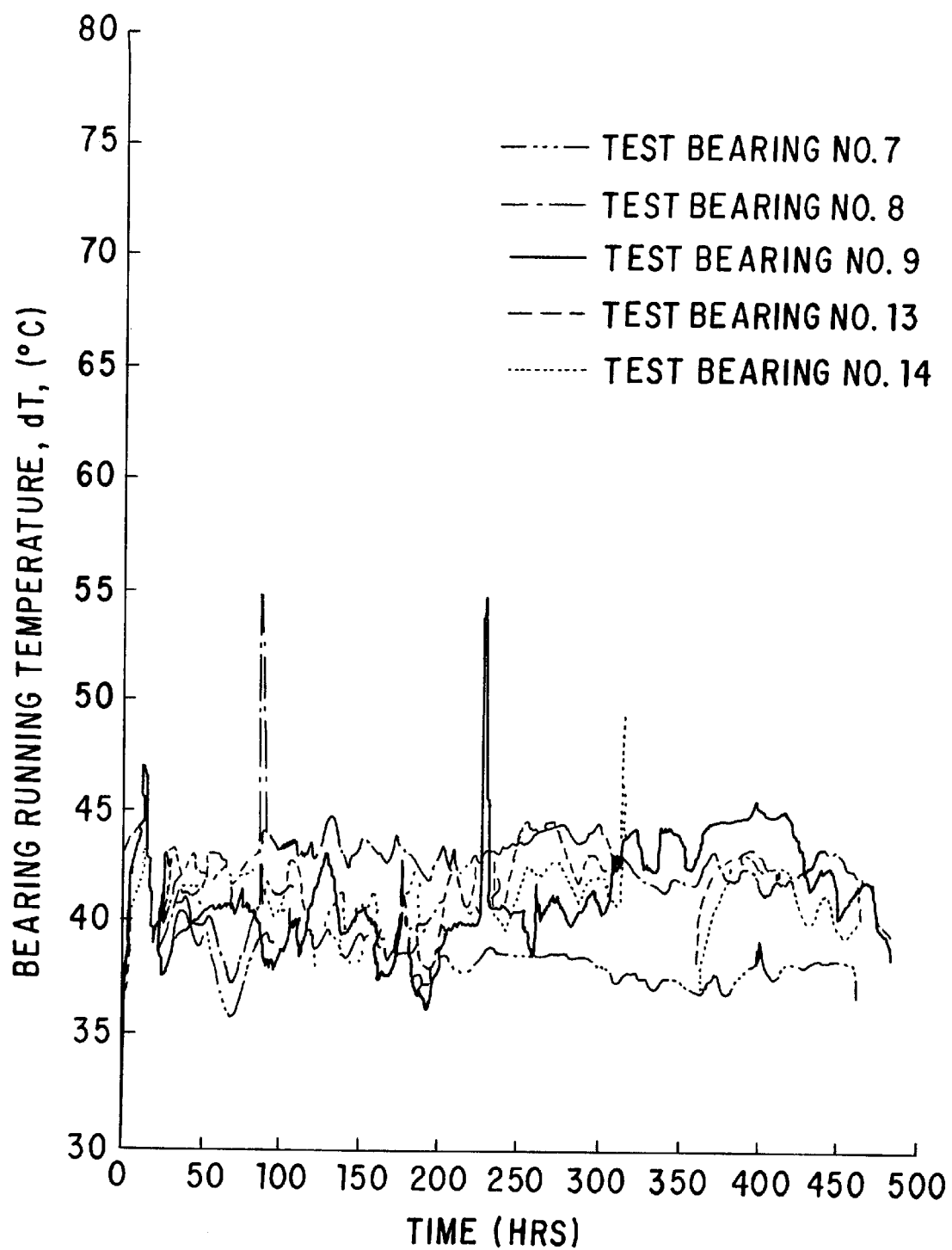
FIG. 3 is a running temperature graph showing bearing performance of Eeonyx-coated cages.

FIG. 3: Bearing performance of Eeonyx-coated cages (invention)

Figure 4A:
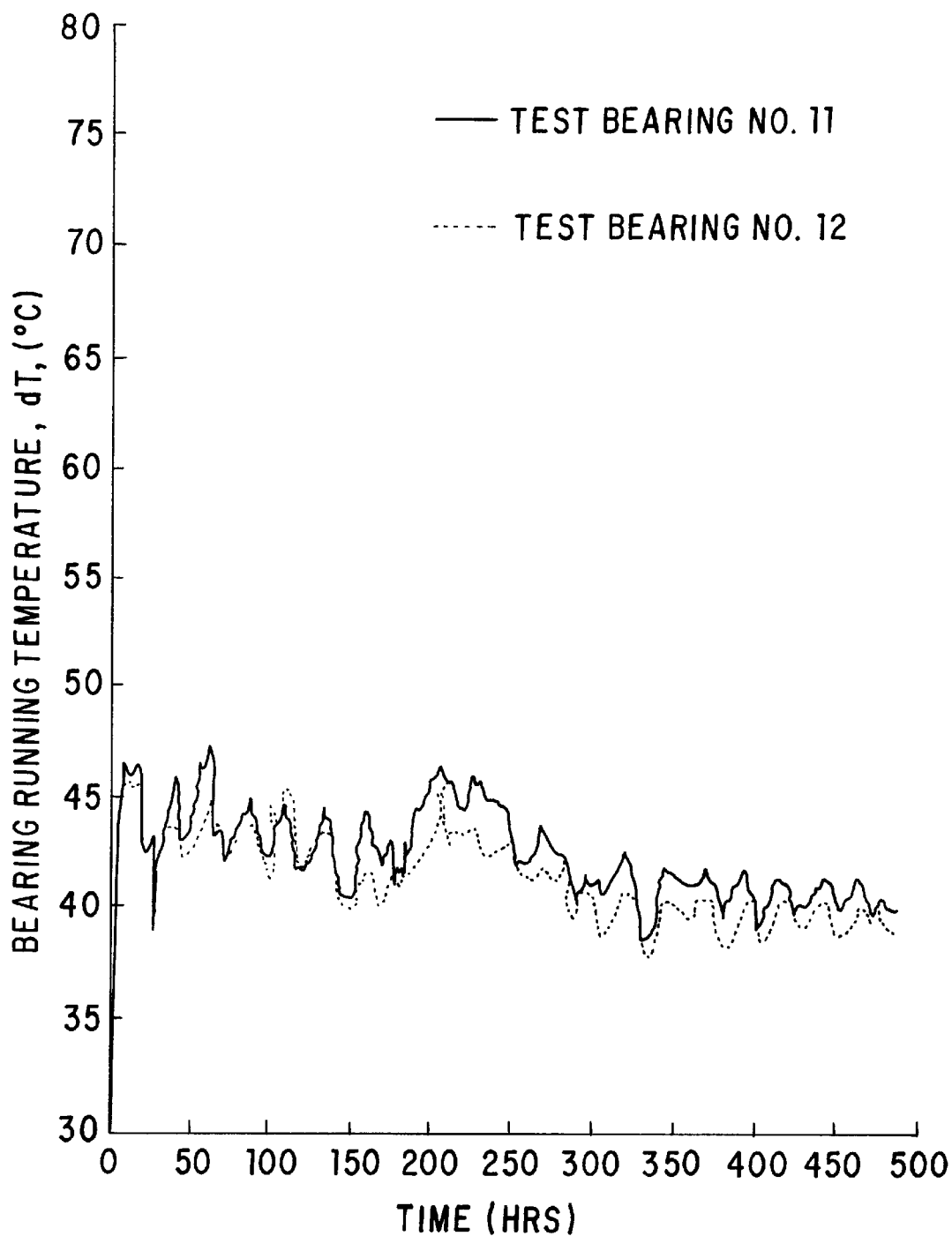
FIG. 4a is a running temperature graph showing bearing performance of Dowty-coated cages.

FIG. 4a Bearing performance of Dowty-coated cages (invention)

Figure 4B:
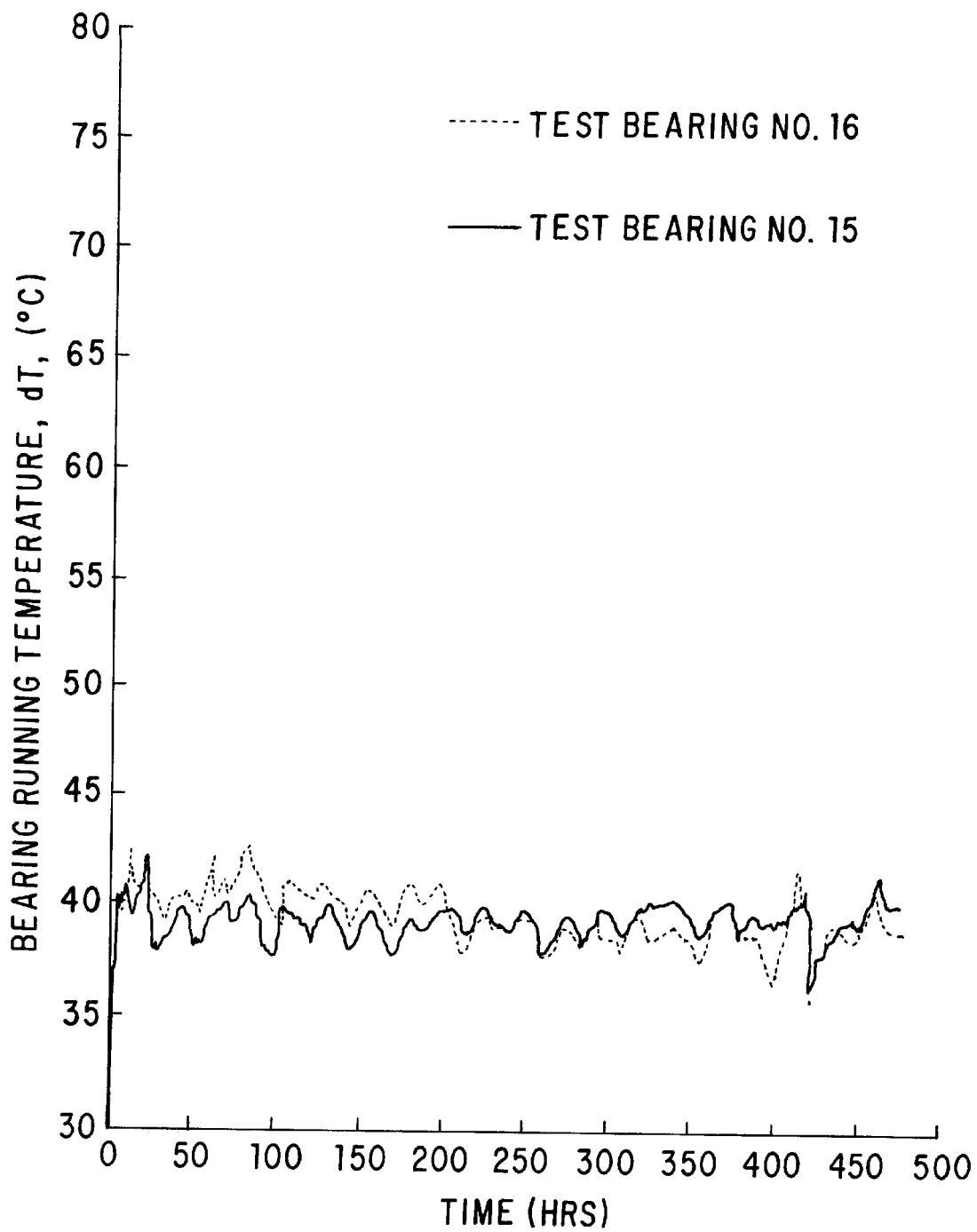
FIG. 4b is a running temperature graph showing bearing performance of Molykote-coated cages.

FIG. 4b Bearing performance of Molykote-coated cages (invention)

Figure 5:
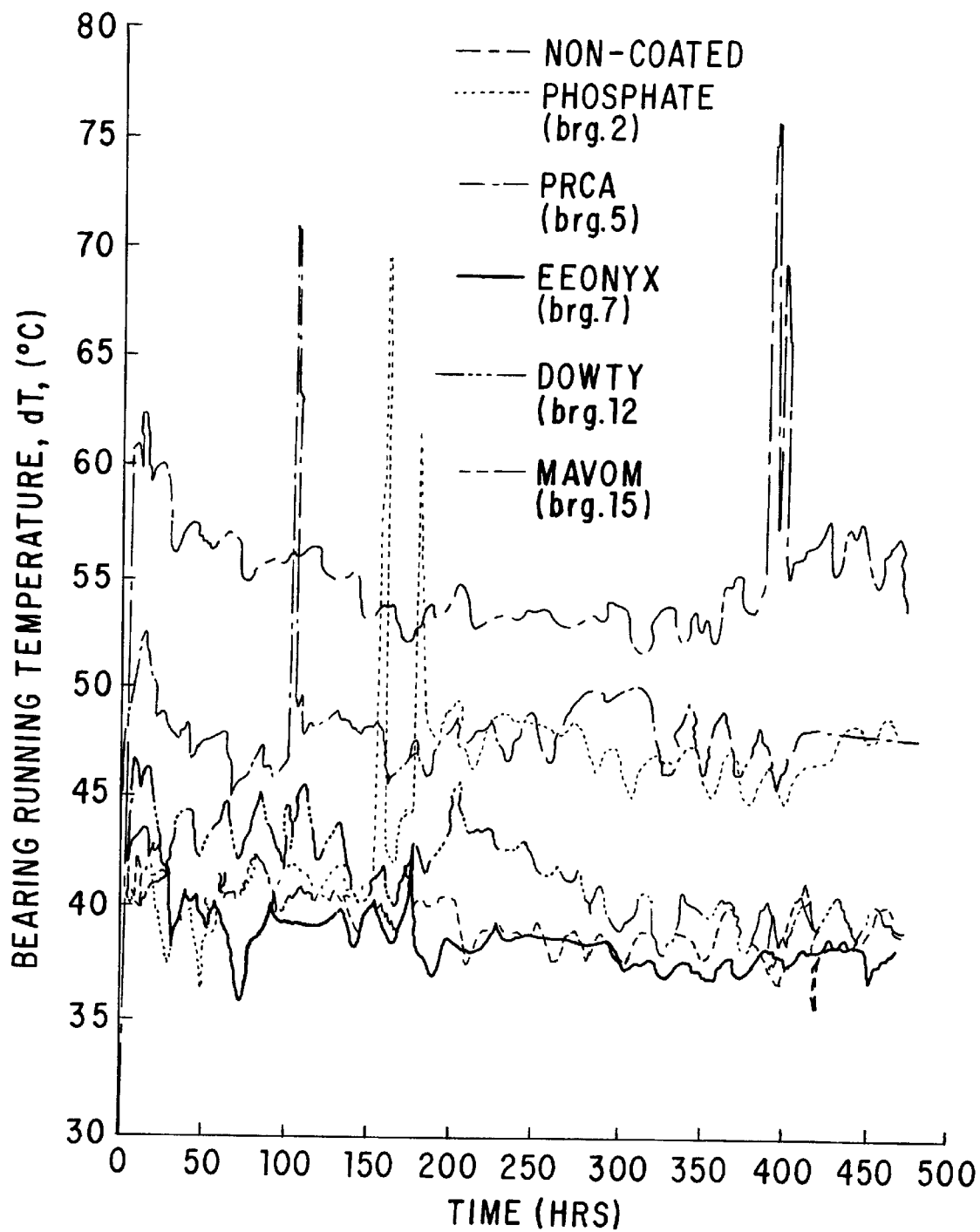
FIG. 5 is a running temperature graph showing bearing performance of selected coatings on cages.

FIG. 5: Bearing performance of selected coatings on cages

EXAMPLE

1. Bearing Test

The bearing test with standard and coated cages were conducted according to the SKF R2F "A" test conditions as shown in Table 1.

TABLE 1

| TEST BEARING | 23312 E/C3 SRB |
|---|---|
| SPEED | 2500 rpm |
| RADIAL LOAD | 8.5 KN |
| TEMPERATURE | Self-induced |
| TEST GREASE | Mostly Alvania R3 (Shell)/LGMT3 (SKF) |
| C/P | 32 |
| TEST TIME | 20 days |

2. Test Materials

Polymer coated SRB cages based on methylacrylate and/or fluoro-polymer, and polytetrafluoroethylene (PTFE)/$MoS_2$ were used in this study. Both proprietary and commercial coating processes based on these materials were used to produce coatings on cages. Details of the coatings and suppliers are listed in Table 2.

TABLE 2

| Coating supplier | Coating material manufacturer | Coating process | Main coating compositions |
|---|---|---|---|
| Polymer Research Corp of America (PRCA), USA | PRCA | "Chemical grafting" (US-A-3,698,931) | Methylacrylate, Fluoro polymer (proprietary formulations) |
| Eeonyx (Formerly Pre-emptive technologies) USA | Eonyx | "Shot peening" (US-A-5,262,214) | PTFE/$MoS_2$ |
| Dowty, England | Whitford | Spraying (commercially available) | PTFE/$MoS_2$ (Product 1052) |
| Mavom, The Netherlands | Molykote | Dipping (commercially available) | $MoS_2$ (Product 7409) |

All test cages used were based on the standard E design. At the time of the project, plain steel cages i.e. untreated cages could not be obtained, all polymer/anti-friction coated cages were executed based on pre-phosphate cages. The phosphate coating was removed at the cage factory (SKF Kogellagerindustrie, Veenendaal, The Netherlands) by rotor finishing. Table 3 summaries the test program conducted.

TABLE 3

| Bearing no. | Coating Company | Coating Type/no. | Grease Used |
|---|---|---|---|
| 1 | PRCA | No. 59 | Alvania R3 |
| 2 | SKF | Standard phosphate | Alvania R3 |
| 3 | PRCA | No. 55 | Alvania R3 |
| 4 | SKF | Standard phosphate | Alvania R3 |
| 5 | PRCA | No. 60 | Alvania R3 |
| 6 | PRCA | No. 61 | Alvania R3 |
| 7 | Eeonyx | PTFE/$MoS_2$ | Alvania R3 |
| 8 | Eeonyx | PTFE/$NoS_2$ | Alvania R3 |
| 9 | Eeonyx | PTFE/$MoS_2$ | LGMT3 "mod" |
| 10 | SKF | Standard phosphate | LCMT3 "mod" |
| 11 | Dowty | PTFE/$MoS_2$ (1052) | Alvenia R3 |
| 12 | Eeonyx | FTFE/$MoS_2$ | Alvania R3 |
| 13 | Eeonyx | PTFE/$MoS_2$ | Alvania R3 |
| 14 | Mavom* | Molykote (7409) | Alvania R3 |
| 15 | Mavom* | Molykote (7409) + phosphating pretreatment | Alvania R3 |

*Representative of Dow Corning in the Netherlands

3. Performance Ranking

All tested bearings were ranked according to their performance with respect to the running temperature ($\Delta T$) and visual damage inspection.

Running Temperature

The bearing temperature (outer ring) was continuously monitored and recorded via computer until the end of the test duration. The pre-set temperature limit for the termination of test is 200° C. The actual bearing running temperature, $\Delta T$, reported is the difference between the outer ring surface temperature and the ambient temperature. Interpretation is generally based on that low running temperature ensures small solid lubricant losses and a smooth plot usually implies a good performance.

Visual Inspection

The rolling elements and the cages of all test bearings were investigated and graded according to the following levels. The higher the score, the better the cage performed its tribological function. The ranking was conducted per bearing side.

5: roller almost as new/little or no wear on roller-cage bar contacts
  4: roller with some scratches/slight wear on roller-cage bar contacts
  3: small brown or polished bands (<30% roller surface)/small wear on roller-cage bar contacts
  2: moderate brown or polished bands (30–50% roller surface)/medium-high wear on roller-cage contacts
  1: large brown/polished bands (>50% roller surface) medium-high wear on roller-cage contacts 4. Test Results a. Performance of Standard Manganese Phosphate Coated Cages (prior art)

Three bearings with standard phosphate coated cages were tested. The high temperature peaks observed for all tests (see FIG. 1) indicate problems of bearing lubrication under test conditions. The duration of all temperature peaks observed is relatively short, and the subsequent drop is probably due to lubricant replenishment. It is suggested that the rapid rise in temperature is mainly due to the high frictional losses between roller and cage pocket contacts, The average running temperature, $\Delta T$, was noted to be in the range of 45°–50° C. (see FIG. 1).

Visual inspections or the test bearings (nos. 2. 4 & 10) were conducted. The ranking is shown in Table 4. The grading of 3 and below indicate the formation of brown bands on rollers and raceways. The phosphate coating on cage contacts was completely removed and medium/high cage contact wear was observed. The results of these tests are in agreement with many previous observations for grease lubricated roller bearing tested under extreme conditions.

b. Performance of PRCA Coated Cages (comparative)

FIG. 2 shows the performance of PRCA grafting polymer coating on cages. The compositions of these coatings were based on fluoro- and acrylate-polymers. It can be seen that high running temperature (>50° C.) and high temperature peeks were recorded for all bearings tested with PRCA coated cages. It is suggested that the very high running temperature, in particular during the first few days resulted from a thicker coating compared with the standard coating thickness. The high temperature peaks are primarily due to the lack of lubricant supply to rolling/sliding contacts and the coatings applied could not prevent high friction forces generated in contacts. The ranking of these bearings (nos. 1. 3, 5 & 6) were unsatisfactory as shown in Table 4. Interestingly, bearing 1 showed no heavy brown bands on rolling elements, but circumferential wear scratches on rollers. The cage contacts revealed high wear on coatings and slight to medium wear on the metal of the cage bar. Also, the PRCA-coatings showed poor adhesion to the metal substrates making them unsuitable for moderate/high stress sliding applications.

c. Performance of Eeonyx Coated Cages

A number of experiments were conducted to observe the performance of the Eeonyx polymer coating on SRB cages. FIG. 3 shows the running temperature of 5 bearings tested. Although few temperature peaks were observed for three bearing runs, it can be seen that the overall running temperature is low compared with the standard phosphate coating or the FRCA coatings. The low running temperature implies solid lubricant between roller and cage contacts, and the temperature peak observed for the bearings tested is attributed to inconsistent quality of the coating process. Bearings No.7 and No.12 performed really well under test conditions.

Table 4 shows the performance ranking of this coating type. No brown bands occurred on the bearing elements of nos. 7 and 12. The other 3 bearings tested, however, revealed some discoloured bands on only one side of bearing rollers. This observation is in a very good agreement with the results of bearing running temperature as discussed above. Bearings performed with ranking 5 showed minimal cage wear, and a slight wear on steel of the cages is observed for bearing ranking 3. It must be noted that the thickness of the coating deposited is about 5 $\mu$m and it is envisaged that a slightly thicker coating would improve the performance.

d. Performance of Other Anti-friction Coatings

Commercially available coating processes based on PTFE/$Mo_2S$ or $MoS_2$ were also investigated. FIGS. 4A and 4B show the running temperature for 4 bearings tested. It can be seen that there is no abnormal or rapid temperature rise and the overall temperature recorded was in the region of 40° C. This means that the average running temperature is about 5°–10° C. lower than the standard phosphate coating. The cages of bearing 16 were deliberately tested with a residual phosphate-$MoS_2$ coating. The test result suggests that the bearing performance is not significantly affected whether the cages are phosphated prior to $MoS_2$ coating or not. The bearing performance ranking of all bearings tested with these commercial anti-friction coatings on cages were excellent as shown in Table 4. Minimal cage wear is observed for all bearing tested.

TABLE 4

| Test Bearing no. | Coating Company | Coating type/no. | Visual Ranking (bearing conditions) side 1 | side 2 |
|---|---|---|---|---|
| 1 | PRCA | no. 59 | 4/3 | 4/3 |
| 2 | SKF | standard | 3 | 3 |
| 3 | PRCA | no. 55 | 4 & 3 | 4 & 3 |
| 4 | SKF | standard | 3 | 2 |
| 5 | PRCA | no. 60 | 4 & 3 | 4 & 3 |
| 6 | PRCA | no. 61 | 4 & 3 | 4 & 3 |
| 7 | Eeonyx | PTFE/$MoS_2$ | 5 | 5 |
| 8 | Eeonyx | PTFE/$MoS_2$ | 3 | 5 |
| 9 | Eeonyx | PTFE/$MoS_2$ | 5 | 3 |
| 10 | SKF | utandard | 3 | 3 |
| 11 | Dowty | PTFE/MoS2 (1052) | 5 | 5 |
| 12 | Eeonyx | PTFE/$MoS_2$ | 5 | 5 |
| 13 | Eeonyx | PTFE/MoS | 5 | 3 |
| 14 | Mavom | Molykote (7409) | 5 | 5/4 |
| 15 | Mavom | Molykote (7409) | 5 | 5 | e. Summary: Comparison Between Selected Coated Cages

FIG. 5 shows a comparison between the bearing performance of non-coated steel cages, phosphate cages. PTFE/$MoS_2$ cages (Eeonyx, Dowty) and $MoS_2$ (Molykote 7409) coated cages. It can be generally concluded that the $MoS_2$ containing solid lubricant coatings performed better than the standard cages with or without phosphate coating. The results clearly conclude that a solid lubricant coating can improve the bearing performance by eliminating the formation of brown bands on rollers and raceways.

5. Conclusion

Based on the above results it can be concluded that the problem associated with the formation of brown bands on rollers and raceways of grease lubricated roller bearings can be eliminated by means of a solid lubricant coating for lowering the running temperature, such as a PTFE/$MoS_2$ or $MoS_2$ (Molykote) coating on bearing cages. Lower running temperature by 5°–10° C. is expected compared with manganese phosphate coated cages.

Three processes have been used to deposit the chemicals on to metal surfaces and bearing cages. The advantage of Eeonyx's process is a fast mechanical method, it can tailor coating thickness down to 3–5 μm and involves no other chemical carriers. The commercial spraying and dipping processes utilise other chemical binders and require high temperature curing.

We claim:

1. A grease lubricated rolling element bearing having an inner ring, an outer ring, a plurality of rolling elements disposed between said inner and outer rings, and a cage for holding the rolling elements at a predetermined spacing between said rolling elements, and having a lubricating grease composition comprising a lubricating base oil and a thickener for said lubricating base oil present on surfaces of said rings, said rolling elements and said cage, wherein said cage is coated on at least parts of its surface that are in sliding contact with said rolling elements, said inner ring or said outer ring, with a solid lubricant containing coating for lowering a running temperature of at least the cage.

2. Grease lubricated rolling element bearing according to claim 1, wherein the solid lubricant containing coating contains a disulfide or diselenide of a Group V or VI transition metal.

3. Grease lubricated rolling element bearing according to claim 2, wherein the solid lubricant containing coating contains $MOS_2$ or $WS_2$.

4. Grease lubricated rolling element bearing according to claim 2, wherein the solid lubricant containing coating contains $MOS_2$ and $WS_2$.

5. Grease lubricated rolling element bearing according to claim 2, wherein the solid lubricant containing coating further comprises an organic resin.

6. Grease lubricated rolling element bearing according to claim 5, wherein said organic resin is PTFE.

7. Grease lubricated rolling element bearing according to claim 1, wherein the thickness of the solid lubricant containing coating is 5–12 μm.

8. Grease lubricated rolling element bearing according to claim 1, wherein at least pockets and bars of the cage have been coated with said solid lubricant containing coating.

9. Grease lubricated rolling element bearing according to claim 1, wherein the entire surface of the cage has been coated with said solid lubricant containing coating.

10. Grease lubricated rolling element bearing according to claim 1, wherein the greased rolling element bearing is a greased spherical roller bearing.

11. Grease lubricated rolling element bearing according to claim 1, wherein the solid lubricant containing coating contains a disulfide and a diselenide of a Group V or VI transition metal.

12. A grease lubricated rolling element bearing having an inner ring, an outer ring, a plurality of rolling elements disposed between said inner and outer rings, and a cage for holding the rolling elements at a predetermined spacing between said rolling elements, and having a lubricating grease composition present on surfaces of said rings, said rolling elements and said cage, wherein said cage is coated on at least parts of its surface that are in sliding contact with said rolling elements, said inner ring or said outer ring, with a solid lubricant containing coating for lowering a running temperature of at least the cage, and wherein said lubricating grease composition is not chemically bonded to the surfaces of said rings, said rolling elements and said cage and said solid lubricant containing coating is chemically bonded to the surfaces of said rings, said rolling elements and said cage.

* * * * *